(12) United States Patent
Adams, Jr.

(10) Patent No.: US 7,594,565 B1
(45) Date of Patent: Sep. 29, 2009

(54) ROD BRAKE

(76) Inventor: Robert Curtis Adams, Jr., 226 S. Main, Romeo, MI (US) 48065

( * ) Notice: Subject to any disclaimer, the term of this patent is extended or adjusted under 35 U.S.C. 154(b) by 619 days.

(21) Appl. No.: 11/119,954

(22) Filed: May 2, 2005

Related U.S. Application Data

(60) Provisional application No. 60/568,723, filed on May 6, 2004.

(51) Int. Cl.
*B65H 59/10* (2006.01)
(52) U.S. Cl. .............................. 188/67; 188/170; 91/41
(58) Field of Classification Search .................. 188/67, 188/68, 69, 170, 265; 91/41, 43, 44; 92/23, 92/24, 26; 269/309, 310, 32, 48.1; 60/593
See application file for complete search history.

(56) References Cited

U.S. PATENT DOCUMENTS

| | | | | |
|---|---|---|---|---|
| 3,556,259 A | | 1/1971 | Allen | 188/67 |
| 3,580,135 A | * | 5/1971 | Jones | 409/231 |
| 3,869,002 A | * | 3/1975 | Koenig, III | 173/166 |
| 3,976,287 A | * | 8/1976 | Kendall et al. | 267/139 |
| 4,479,397 A | | 10/1984 | Jelinek et al. | 74/89.15 |
| 4,526,086 A | * | 7/1985 | Holton et al. | 91/43 |
| 4,534,269 A | | 8/1985 | Scerbo et al. | 91/41 |
| 4,564,088 A | | 1/1986 | Takahashi et al. | 188/67 |
| 4,714,289 A | * | 12/1987 | Arzenti et al. | 294/119.3 |
| 5,115,889 A | | 5/1992 | Fortmann et al. | 188/67 |
| 5,351,789 A | | 10/1994 | Tochihara et al. | 188/67 |
| 5,540,135 A | | 7/1996 | Goellner | 91/41 |
| 5,791,230 A | | 8/1998 | Goellner | 92/19 |
| 6,152,268 A | | 11/2000 | Goellner et al. | 188/67 |
| 6,478,123 B2 | | 11/2002 | Seggebruch et al. | 188/170 |
| 6,513,988 B2 | * | 2/2003 | Kurz | 384/605 |
| 6,598,713 B1 | | 7/2003 | Kawakami | 188/67 |
| 6,886,822 B2 | * | 5/2005 | Kawakami | 269/309 |
| 7,108,108 B1 | * | 9/2006 | Heinzeroth | 188/67 |
| 2002/0112929 A1 | | 8/2002 | Koshak | 188/67 |
| 2003/0226725 A1 | | 12/2003 | Allen et al. | 188/67 |

\* cited by examiner

*Primary Examiner*—Robert A Siconolfi
*Assistant Examiner*—Mariano Sy
(74) *Attorney, Agent, or Firm*—Young Basile

(57) ABSTRACT

A rod brake includes a housing containing a pressure vessel and a piston intensifier. The pressure vessel has a bearing tube with a bore sized to receive a movable rod. A cavity is provided between an inner wall of the pressure vessel and the bearing tube for a pressure medium carried therein. Access is provided for surface-to-surface contact with a portion of the piston intensifier and the pressure medium. The piston intensifier includes a piston movable by an external force such as a compression spring or air pressure. The piston has an inner face having an annular ring attached or integrally formed with the piston. Alternatively, the piston has a plurality of dowels extending from the inner face. Free ends of the annular ring or dowels are in surface-to-surface contact with the pressure medium so that the force on the piston transmitted over the small contact area of the free ends of the dowels or the annular ring results in a high pressure in the medium providing a braking force against the bearing tube and rod proportional to the pressure in the medium.

8 Claims, 2 Drawing Sheets

ROD BRAKE

This application claims benefit of U.S. priority patent applications: Ser. No. 60/568,723 filed on May 6, 2004 herein incorporated by reference.

BACKGROUND OF THE INVENTION

This invention relates to a rod brake. Rod brakes, frequently used on pneumatic or hydraulic cylinders are more properly rod locks. That is, they are used for the locking of a stopped shaft. In emergency cases, the rod brakes can be used to stop a moving shaft. However, there is a risk of damage to the brake and to the shaft. There are two common types of rod locks. First is a collet lock. In a collet lock, a collet, through which the shaft passes, squeezes on the shaft through means of tapered balls, wedges or mechanical levers. The second type is a pivot or swash plate design. In this design, the rod or shaft passes through a hole in an eccentrically mounted plate. Spring action and motion of the rod causes the plate to twist and bind on the shaft. This type of brake typically operates only in one direction. Further, neither type of brakes of the prior art is suitable for stopping rotational motion of the rod. In addition, both brakes require hardened or high strength steel shafts which adds increased costs to the entire system.

SUMMARY

It is the intent of the present invention to address the aforementioned concerns. In one aspect of the invention a rod brake for stopping a movable rod is provided that includes a pressure vessel and a bearing tube positioned in the pressure vessel having a bore sized for receiving the rod therethrough. A cavity is formed between an inner wall of the pressure vessel and the bearing tube wherein the cavity is filled with a pressure medium. Means are provided for applying a force to the pressure medium to provide a braking force to the bearing tube and rod.

In another aspect of the invention, a piston communicates with the pressure medium, wherein the rod brake includes means for increasing the force transmitted from the piston to the pressure medium.

In yet another aspect of the invention, an annular ring extends from an inner face of the piston wherein the annular ring has a free end in surface-to-surface contact with the pressure medium.

In still another aspect of the invention, the piston has at least one dowel extending from a face of the piston, wherein the at least one dowel has a free end in surface-to-surface contact with the pressure medium.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE INVENTION

Figure 1:
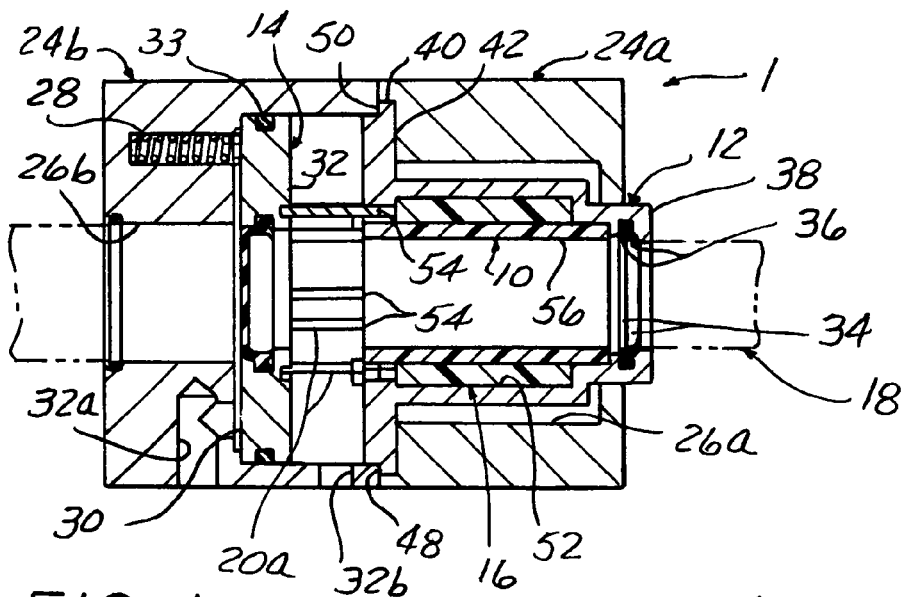
FIG. 1 is a side sectional view of the rod brake according to the present invention.
Figure 2:
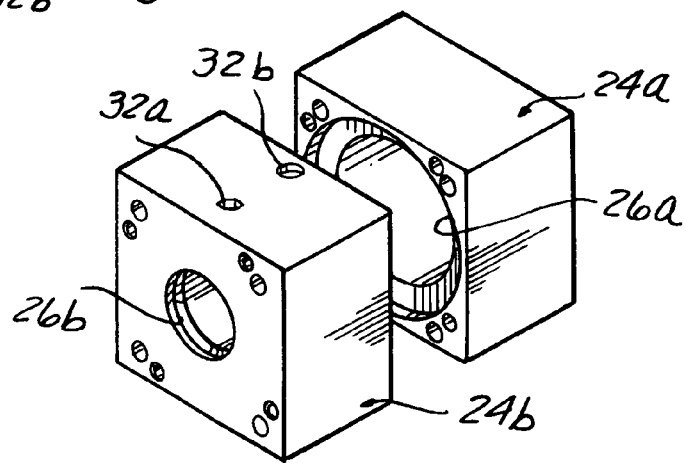
FIG. 2 is an exploded perspective view of a two-part housing for the rod brake.

Referring to the FIGS. 1-8, the present invention relates to a rod clamp/brake device 1 capable of holding a brake rod or shaft 18 in a stopped position from an axial and/or rotational movement of the rod 18. The rod brake 1 of the present invention includes five primary components: a bearing/brake lining tube 10; a pressure housing or vessel 12; a piston intensifier 14; an elastomer pressure medium 16; and the brake rod or shaft 18 are disclosed.

The rod brake 1 is contained in a housing. In the preferred embodiment the housing is a two-part container: a brake housing 24a and a piston housing 24b connected together by conventional screws (now shown). The brake and piston housing 24a, b, respectively, include through apertures 26a, 26b, respectively, for movement of the rod 18 therethrough and for holding the piston intensifier 14 and the pressure vessel 12 in proper axial alignment relative to each other. As seen in FIG. 1, the piston housing 24b includes one or more compression springs 28 in axial communication with the piston intensifier 14. The piston intensifier 14 includes a plurality of dowels 20a radially extending from an inner face 32 of a piston 30 so that the dowels 20a extend equally around the rod or shaft 18. The dowels 20a extend in the same axial direction as the rod 18 for contact with the pressure medium 16 housed in the pressure vessel 12 in the brake housing 24a. The piston housing 24b further includes a fluid conduits 32a, b communicating with the surfaces of the piston 30 for the application of air pressure to either surface of the piston 30 for activating or releasing pressure on the pressure medium. Solenoids (not shown) may also be used in place of fluid pressure for electromechanical actuation of the piston. The piston 30 has a groove 31 along its peripheral edge for the disposition of a gasket 33 to maintain an airtight system. The piston 30 also has a concentric groove slots 35 formed on the inner face 32 for the disposition of the dowels 20a or the annular ring 20b.

Figure 3:
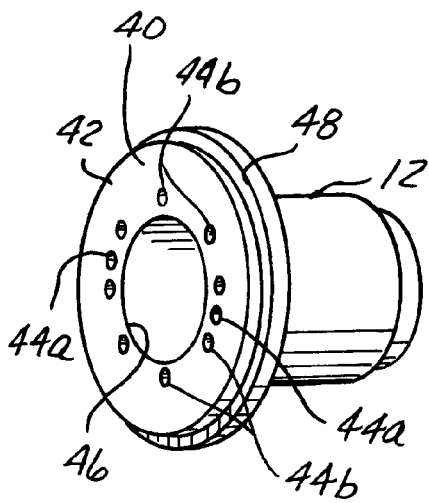
FIG. 3 is a perspective view of a pressure vessel for the rod brake.
Figure 4:
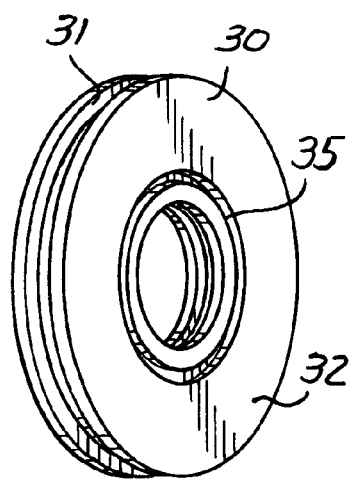
FIG. 4 a perspective view of a piston for the rod brake.
Figure 5:
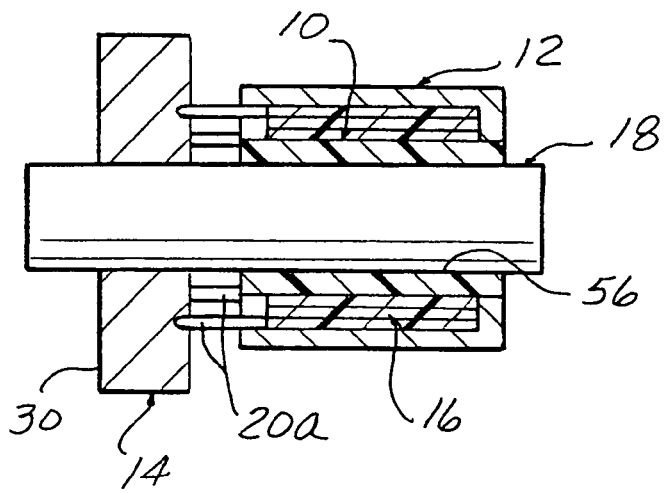
FIG. 5 is a sectional view of the pressure vessel with a pressure medium and a shaft or rod passing therethrough.
Figure 6:
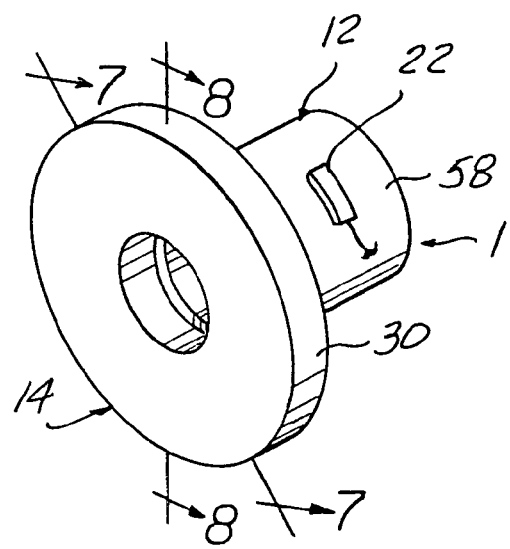
FIG. 6 is a perspective view of a second embodiment of the pressure vessel and a piston having an annular ring integrally attached thereto.

The brake housing 24a encloses the pressure vessel 12, as shown in FIGS. 3 and 6. The pressure vessel 12 holds the braking means for stopping the rod 18 and holding the rod 18 in the stopped position from axial and/or rotational movements. The pressure vessel 12 preferably has a pair of annular grooves 34 for receiving wiper seals 36 at a first end 38. The first end 38 is exposed beyond the brake housing 24a. The pressure vessel 12 has a second end 40 forming a flange 42. The flange 42 has a plurality of apertures 44a, 44b radially spaced around a concentric throughbore 46 sized for receiving the rod 18. The radial apertures 44a are sized for receiving bolts to connect the pressure vessel 12 to the brake housing 24a. The flange 42 on the pressure vessel 12 has a radial shelf 48 formed along its peripheral edge to abut against the inner edge 50 of the piston housing 24b. Because of the high pressure exerted within the pressure vessel, the pressure vessel is preferably constructed of a high strength steel. Each of the brake and piston housings 24a, 24b is preferably made of an aluminum material.

Along the inner surface 52 of the bore of the pressure vessel 12 is the pressure medium 16. The pressure medium 16 is preferably a castable elastomer gel. The elastomer gel is preferably a silicone rubber. One type of elastomer gel is Silastic® J-RTV brand silicone, a trademark of Dow Corning Corporation. Another type of elastomer gel is known as Zello 317® by Zeller International. Other incompressible elastomers may be used. The elastomer gel 16 is sandwiched between the bushing or brake lining 10 and the inner wall 52 of the pressure vessel 12. The free ends 54 of the plurality of dowels 20a are in contact with a lateral edge of the elastomer gel 16 through the set of evenly spaced apertures 44b in the flange 42 of the pressure vessel 12.

Figure 7:
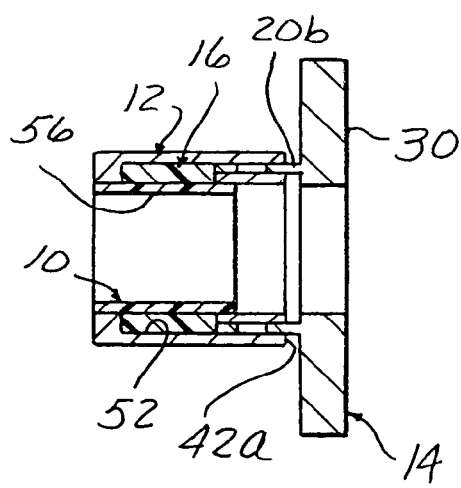
FIG. 7 is a sectional view of the pressure vessel and piston taken along lines 7-7 of FIG. 6.
Figure 8:
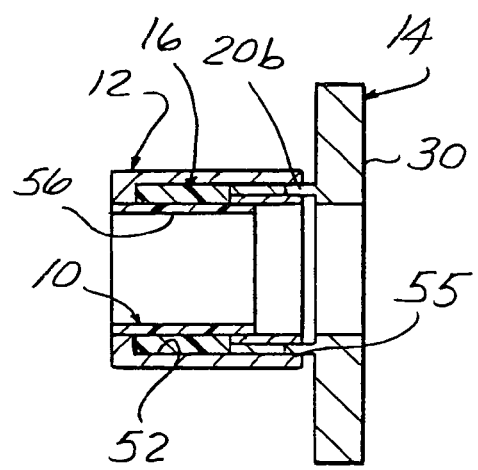
FIG. 8 is a sectional view of the pressure vessel and piston taken along lines 8-8 of FIG. 6.

In a second embodiment of the invention, shown in FIGS. 6-8, the dowels 20a of the piston intensifier 14 are replaced with an annular ring 20b extending from the inner surface of the piston 30. The inner edge 42a of the pressure vessel 12 has an annular opening 55 for access of the annular ring 20b into the cavity between the brake lining/bushing 10 and the inner wall 52 of the pressure vessel 12.

The brake bearing/bushing 10 provided in both embodiments is a thin tubular member having a center bore 56 for passage of the rod 18. The bearing tube 10 is preferably made of a compound form of tetrafluorethylene (TFE) fluorocarbon. One such material is Rulon®. The compound material has high strength and a low flexural modulus.

Force exerted upon the piston intensifier 14 by the compression spring 28 or other external force is transmitted to the elastomer pressure medium 16 contained within the pressure housing 12 via the dowels 20a or the annular ring 20b. The axial force on the piston intensifier 14 that is transmitted over the small contact area using dowels 20a or annular ring 20b with the pressure medium 16 results in a high compression pressure in the medium 16. The dowels 20a or ring 20b are in surface-to-surface contact with the pressure medium 16. The bearing tube 10, having a low flexural modulus material, compresses/collapses in upon the rod 18 passing through the center bore 56 of the brake bearing 10. The braking force on the rod 18 is proportional to the pressure developed by the dowels 20a or annular ring 20b, the coefficient of friction between the bearing material 10 and the rod 18, and the contact area between the bearing 10 and the rod 18.

Force on the piston intensifier 14 can be generated through air pressure on the piston 30 through air passage 32a or through spring action on the compression spring 28. In the latter case, air pressure through air passage 32b on the piston 30 relieves the braking force. A strain gauge 22 (shown in FIG. 6) may be placed on an outside surface 58 of the pressure vessel 12 to read pressure on the rod 18 to determine whether or not the brake is applied and to determine the amount of force on the rod 18.

The brake material, also being a bearing material of the bushing 10, allows the brake to be used in place of a rod bushing on a fluid power cylinder. The relative high load capacity of the selected bearing 10 material allows the rod 18 to carry a significant side load without damage to the bearing 10 or seals contained within. As stated supra, the preferred material for use of the brake or bushing material is a compound form of TFE fluorocarbon ingredients.

Having one moving part, the rod brake of the present invention is much simpler than conventional brake mechanisms utilizing collets, wedges, swash plates, etc. The piston intensifier 14 motion is dependent on the bearing-to-rod clearance. If clearances are low enough, the rod brake of the present invention can be thought of as having no moving parts.

The rod brake of the present invention also has the advantage that it may be used in a spring applied/air released condition as a safety stop. In an air applied condition, it may be used to control or meter rod speed. By the addition of an electro-pneumatic transducer (Numatics R83/84/85) (not shown), the brake may be used in conjunction with a conventional four-way valve, and a feedback transducer, for velocity or position control.

Simple strain gauges 22 may be adhered to the outside surface 58 pressure vessel 12. In a conventional Wheatstone bridge, (not shown) the output of the strain gauge 22 may be used to feedback brake force. The bridge output is proportional to the brake holding force. This proportional signal may be used as part of a switching circuit to signal "brake released" or "brake engaged" conditions. It may also be used directly as part of a position or velocity control system.

As a result of the large potential surface area of the bearing material 10, there is no anticipated upper practical limit to the size of the brake. There may be a lower limit, however, in that the manufacturing tolerances may limit the ability to intensify pressure to a suitable point.

The rod brake 1 of the present invention provides a truly dynamic brake because an increase of the duty cycle may be tolerated by adding external cooling to the pressure vessel 12 or the brake rod 18.

Proper selection of the brake lining 10 material, as discussed supra, will allow for non-conventional brake shafts 18 including, but not limited to: non-hardened or plated steel, stainless steel, and hard-coated aluminum. Further, the rod brake 1 is applicable for stopping rotational movement of the rod 18, as well as the rod's axial movement. The rod 18 remains in the stop position until the applied pressure is released from the piston intensifier 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rod brake for stopping a moveable rod, the rod brake comprising:
   a pressure vessel;
   a bearing tube having an axial length and positioned in the pressure vessel and having a bore size for receiving the rod therethrough, said bearing tube in surface-to-surface contact with the rod along the entire axial length;
   a pressure medium in direct contact with the bearing tube and the pressure vessel;
   a cavity formed between an inner wall of the pressure vessel and the bearing tube, said cavity filled with the pressure medium;
   a piston configured to apply a force to the pressure medium to provide a braking force to the bearing tube and rod; and
   means for increasing the force transmitted from the piston to the pressure medium, wherein the means for increasing the force from the piston on the pressure medium includes at least one dowel extending from a face of the piston, wherein the at least one dowel extends into the pressure vessel and has a free end in surface-to-surface contact with the pressure medium.

2. The rod brake of claim 1, further comprising means for applying a force to the piston is air pressure going through a fluid conduit in a piston housing for activating or releasing the pressure on the pressure medium.

3. The rod brake of claim 1, wherein the pressure vessel and piston are contained in a housing.

4. The rod brake of claim 1, further comprising a means for measuring the pressure applied to the pressure medium.

5. The rod brake of claim 4, wherein the means for measuring the pressure is a strain gauge positioned on the pressure vessel.

6. The rod brake of claim 1, further comprising at least one of a compression spring and pressurized air applied to the piston for a movement toward the pressure vessel.

7. The rod brake of claim 1, wherein the bearing tube is made of a material having a high load capacity and a low flexural modulus.

8. A rod brake for stopping a movable rod, the rod brake comprising:
- a brake housing and a piston housing connected together;
- a pressure vessel contained in the brake housing;
- a bearing tube having an axial length and positioned in the pressure vessel and having a bore size for receiving the rod therethrough, said bearing tube made of a compound material having high strength and low flexural modules and in surface-to-surface contact with the rod along the entire axial length;
- a pressure medium made of an incompressible elastomer in direct contact with the bearing tube and the pressure vessel;
- a cavity formed between an inner wall of the pressure vessel and the bearing tube, said cavity sandwiching the pressure medium therein;
- a piston configured to apply a force to the pressure medium to provide a braking force to the bearing tube and rod; and
- a pressure intensifier protruding from an inside face of the piston, said pressure intensifier having a free end in surface-to-surface contact with the pressure medium for increasing the force transmitted from the piston to the pressure medium.

* * * * *